United States Patent Office 3,535,119
Patented Oct. 20, 1970

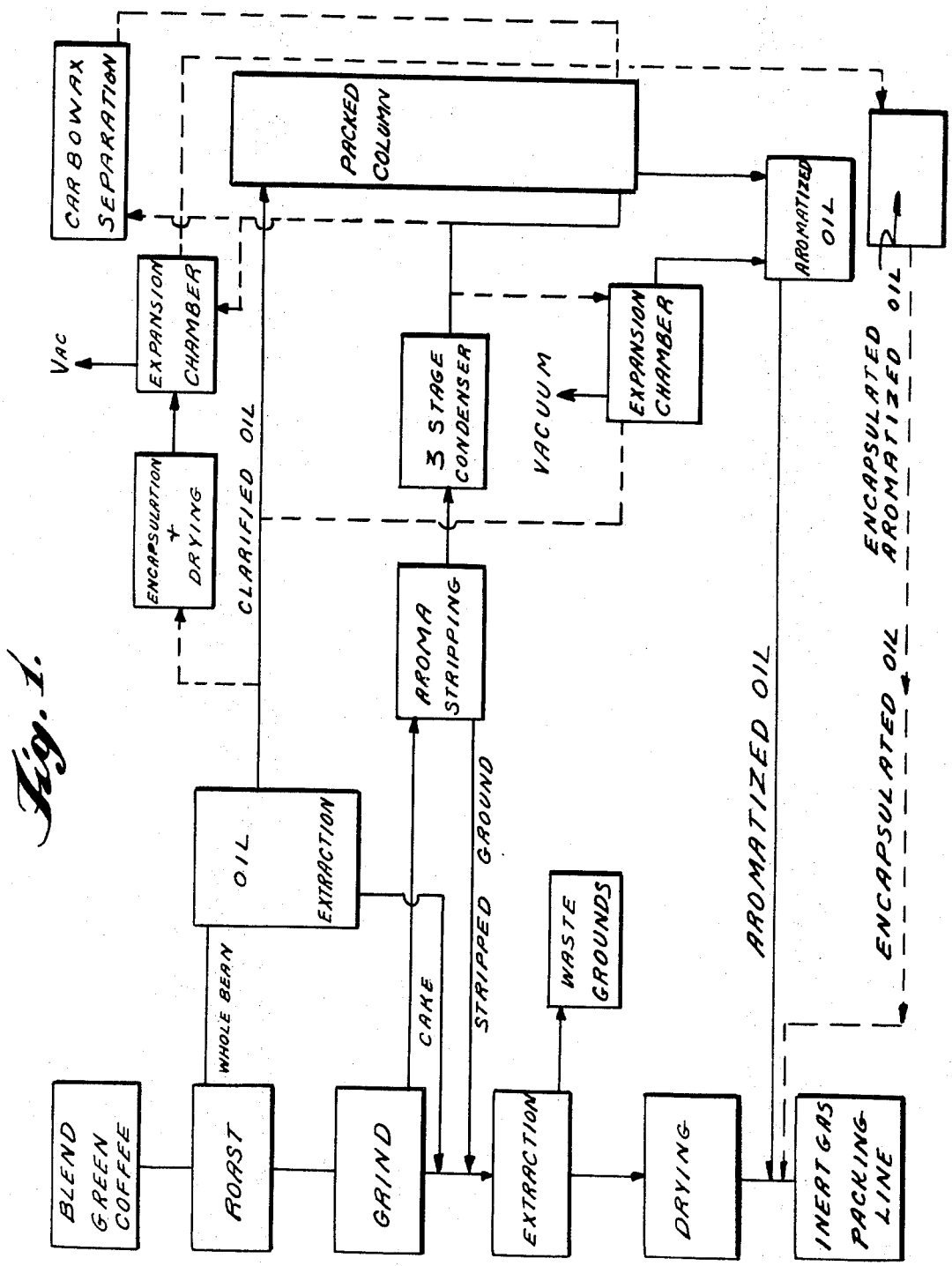

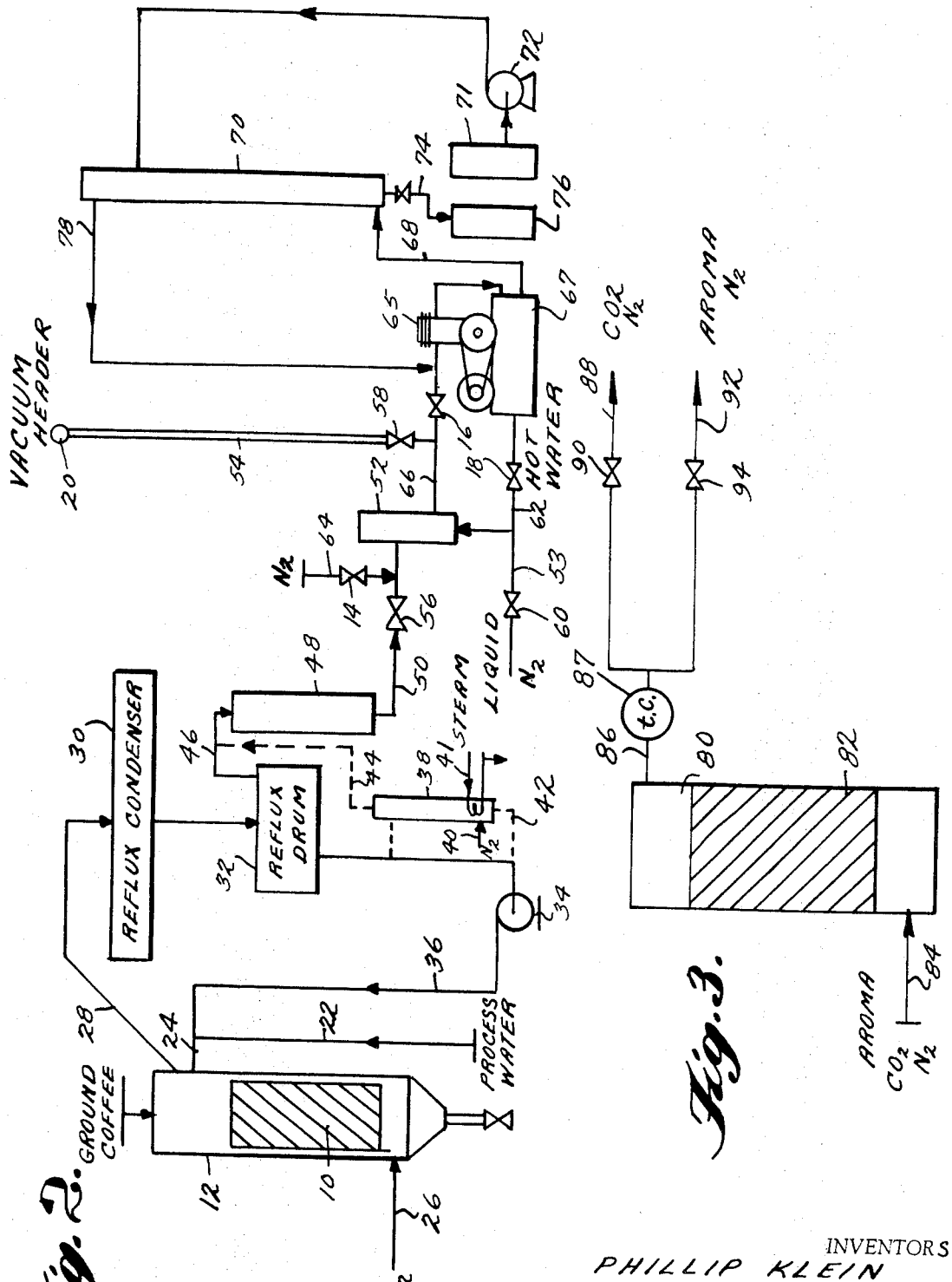

3,535,119
COFFEE AROMA GRANULES AND METHOD OF MAKING SAME
Phillip Klein, 148 Fleming Road, Wyoming, Ohio 45215; Irwin Raben, 9 Yarmouth Court, Oakland, Calif. 94619; and William R. Herrera, 222 Langton, San Antonio, Tex. 78216
Continuation-in-part of application Ser. No. 422,649, Dec. 31, 1964. This application Sept. 3, 1968, Ser. No. 757,015
Int. Cl. A23f 1/08
U.S. Cl. 99—71                         3 Claims

ABSTRACT OF THE DISCLOSURE

A granular product containing coffee aroma constituents for addition to instant coffee powder. Aroma constituents are evaporated from ground coffee and are collected. The aroma is absorbed into granules made by spray drying an emulsion of coffee oil and a solution of a water soluble edible gum.

---

This is a continuation-in-part of prior U.S. application 422,649 filed Dec. 31, 1964, now U.S. Pat. No. 3,406,074.

This invention relates to instant coffee of improved flavor and aroma, and a granular product containing coffee aroma, useful as an additive for instant coffee powder.

In a general way, the manufacture of instant coffee consists of the following stages: roasting and grinding of the coffee; extraction of water solubles; and spray drying of the water extract. It is known that roaster gas, as well as grinder gas, contains aroma constituents which are lost in the plant. It is also believed that there is a further loss of the desirable characteristics of whole coffee in the extraction process as a result of hydrolysis. Spray drying also results in a reduction of desirable volatiles. As a consequence, dry coffee extracts thus produced are either practically odorless or else do not provide an aroma reminiscent of freshly roasted coffee.

There are many sources of coffee aroma which can be added to instant coffee to improve its aroma and flavor. This invention relates to a product containing coffee aroma, preferably substantially free of moisture and carbon dioxide, which possesses highly desirable characteristics. Briefly stated, the invention comprises stripping volatilizable aroma from roasted ground coffee, collecting the aromatic constituents, and incorporating the aroma constituents into capsules containing an edible gum and oil, the capsules then being blended with instant coffee.

The ultimate object of this invention is to produce an instant coffee having improved aroma characteristics.

Another object of this invention is to provide an improved process for the production of a coffee aroma in both the jar and the cup.

Yet another object of this invention is to produce an instant coffee containing capsules in which aromatized coffee oil is incorporated.

The processes of the invention are diagrammatically illustrated in the accompanying drawings in which:

FIG. 1 is a diagrammatic flow sheet of the over-all process;

FIG. 2 is a diagrammatic flow sheet of the aroma stripping and aroma absorbing process; and FIG. 3 is a diagrammatic flow sheet of the process for separating carbon dioxide from the aroma-bearing fraction obtained from the stripping operation.

In the preferred process of FIG. 1, a blend of green coffee is roasted and one part of the roasted coffee is pressed in an oil expeller to produce coffee oil. After clarification, as by filtering or centrifuging the raw oil, the coffee oil is aromatized for later return to the instant coffee as will hereinafter be more fully described.

The remaining portion of the coffee is ground and a portion subjected to a stripping operation using an inert gas e.g. nitrogen, argon, helium or neon at low pressure whereby aroma constituents, carbon dioxide, and water are carried off by the gas stream. In the preferred embodiment, the roasted ground coffee is maintained in a moist condition during the stripping operation because water is known to assist in the displacement of aromatic principles from roasted coffee. The aroma-bearing gas stream from the stripping operation is passed through three condensers in series at successively lower temperatures. The first condenser cools the gas stream to a temperature in the range of about 34–38° F. whereby approximately 99% by weight of the water is removed by condensation. The second condenser cools the aroma-bearing gas stream to a temperature in the range of about −86 to −97° F. whereby the water content of the gas stream is reduced to the range of about 2 to 5 p.p.m. Thereafter, the gas stream is passed through a final condenser at about −320° F. to −325° F. whereby the aroma constituents are condensed and collected as a frost. The frost which is collected in the final condenser contains in addition to the aromatic constituents, carbon dioxide and about 2 p.p.m. of water.

In accordance with the present invention, the coffee oil is dispersed in an edible gum such as gum acacia and spray dried and the collected aroma is absorbed into these particles preferably by means of an expansion chamber. The particles of encaspulated coffee oil formed preferably are in the same size range as dry instant coffee.

In the stripping operation only about 2% by weight of the material condensed in the final condenser consists of aroma constituents, the remaining portion of the material consisting essentially of carbon dioxide. The absorption of the aroma constituents into the encapsulated coffee oil is improved by removing the carbon dioxide. Carbon dioxide can be separated from the aroma-bearing fraction by vaporizing a predetermined volume of the aroma-bearing fraction and passing it through a column packed with a high molecular weight polyethylene glycol solid, e.g. Union Carbide Chemicals' Carbowax 1500, dispersed on a highly sorptive granular support material, e.g. Johns-Manville Company's Chromosorb P by means of an inert carrier gas which will be described in more detail hereinafter.

That portion of the roasted ground coffee not subjected to stripping or expressed for coffee oil is mixed with the coffee residues from the expressing and stripping operation. An aqueous extract of the later mixture is prepared and evaporated to the form of a dry coffee powder. The expressed coffee oil that has been aromatized in capsule form is then incorporated into the dry coffee powder to produce an instant coffee having improved flavor and aroma. A portion of the expressed coffee oil may be plated on the dry powder and the aroma essence added to the plated instant coffee by absorption in a vacuum, or plated on the dry powder after absorption of aroma.

The proportion of the total coffee subjected to expression for removal of oil is approximately 5% by weight of the total. Although the coffee beans contain approximately 15% by weight of oil, in this process only about 5% of the oil is removed on a green basis and about 6% on a roasted basis.

The amount of the coffee subjected to the stripping operation is in the range of 5 to 15% of the total weight of coffee in the final extractor charge.

The aroma stripping and absorption process are shown in detail in FIG. 2. As a specific example, 600 pounds of ground roasted coffee is placed in bed 10 in column 12.

The optimum ratio of the height of the coffee bed 10 to the diameter of the column 12 is 6 to 1 but other geometric ratios of 3 or 4 to 1 can operate satisfactorily. During the stripping cycle valves 14, 16 and 18 are closed. A vacuum is applied at 20 so as to maintain a pressure of 40 mm. Hg absolute in the system. To assist in the displacement of aromatic materials from the roasted coffee sufficient water is fed into the column 12 through lines 22 and 24 to moisten the coffee. The preferred ratio of coffee to water is 1:1 on a weight basis. It is to be understood, however, that the coffee can be stripped dry but with a very poor yield of aroma. The bed 10 is then heated to 105° F. An inert stripping gas, preferably nitrogen, at a rate of 2.1 cubic feet per minute, a temperature of 110° F., and a pressure of 80 mm. Hg absolute is fed into the bottom of the stripping column 12 through line 26 so as to pass up through the bed 10. The nitrogen gas and entrained aroma constituents, carbon dioxide, and water pass out of column 12 through line 28.

From the stripping column 12, the aroma-bearing gas stream is fed into a condenser 30 and cooled to a temperature of 38° F. whereby approximately 99% by weight of the water is condensed and collected in reflux drum 32. A portion of the water, approximately 0.6 gallon per minute, is removed from reflux drum 32 and recycled by pump 34 through line 36 back to column 12 to maintain the bed 10 in a satisfactory wet condition. The reflux water rate can vary from 0.2 to 1.0 gallon per minute. If desired, the reflux water may be passed through a heater to raise its temperature to the equilibrium temperature of the bed 10 so as to maintain a more stable bed temperature. Alternatively as shown by the dotted lines, the water from the reflux drum 32 may be fed into a small stripping column 38 to remove any soluble aroma constituents. An inert stripping gas, preferably nitrogen, is fed into the bottom of column 38 through line 40 so as to pass countercurrent to the flow of the reflux water. The nitrogen rate is sufficient to maintain a linear velocity of 1 to 2 feet per second in the column 38. A steam coil 41 is installed in the bottom of the stripping column 38 to maintain an equilibrium temperature corresponding to the pressure in the column 38. The water leaves the column through line 42 and is recycled by pump 34 through line 36 back to the main stripping column 12. The nitrogen entrained with aroma constituents from column 38 passes through line 44 and merges with the aroma-bearing gas stream from reflux drum 32 and line 46. The gas stream is then passed through condenser 48 cooled with R–22 (Freon) or an acetone-Dry Ice refrigerant capable of obtaining —90° F. where it is reduced to a temperature of —90° F. and whereby the water vapor content of the gas stream is reduced to about the range of 2 to 5 p.p.m. Lowering the water content of the gas stream to this level stabilizes the quality of the aroma-laden gas. The gas stream from condenser 48 is passed through line 50 and into condenser 52 where it is cooled to a temperature of —320° F. Condenser 52 is in the form of a trap cooled with liquid nitrogen cold fingers distributed uniformly in the enclosed condenser. The liquid nitrogen is fed into the cold fingers through line 53. A bypass line is provided around the final condenser or aroma trap 52 to enable easy removal of the condenser. In condenser 52 all materials present in the gas stream are condensed except for nitrogen which is exhausted from the system through line 54. The aroma-bearing fraction is condensed as a frost and consists essentially of 98% by weight carbon dioxide, 2% by weight aroma and approximately 2 p.p.m. water. In a specific example stripping was carried out for a period of one hour and the condensed aroma-bearing fraction consisted of 0.05 pound aroma constituents, 2.4 pounds of carbon dioxide, and 0.0003 pound water.

After the stripping cycle is completed, the condenser 52 containing the aroma-laden material is isolated from the stripping system by closing valves 56 and 58 and the flow of liquid nitrogen is cut off from condenser 52 by closing valve 60. After condenser 52 has warmed up to ambient conditions, valves 14, 16 and 18 are opened and hot water is fed through line 62 into the coils surrounding condenser 52 so as to vaporize the aroma-bearing frost contained therein. Nitrogen is passed into the condenser 52 through line 64 to purge the aroma-bearing vapor from the condenser. The aroma-bearing vapor is fed into a compressor 65 through line 66 at a pressure of 25 p.s.i.g. which is the autogenous pressure produced in condenser 52 as the result of vaporizing the aroma-bearing frost. The compressor 65 raises the pressure of the aroma-bearing gas stream to approximately 70 p.s.i.g.

The aroma essence can be absorbed into coffee oil by flash absorption. The coffee oil is frozen and the container evacuated to a pressure of 1 mm. Hg absolute. The coffee oil is allowed to thaw and the aroma collected from the stripping operation is transferred from the liquid nitrogen condenser 52 into the evacuated reservoir containing the coffee oil. The coffee oil and aroma are then allowed to equilibriate for a period of approximately 8 hours.

It has been found that removing the carbon dioxide from the aroma-bearing fraction obtained from the stripping operation greatly increases the rate of absorption of the aroma constituents into the coffee oil. Separation of carbon dioxide from the aroma-bearing fraction can be efficiently accomplished by employing the principle of elution chromatography. Referring to FIG. 3, there is shown a column 80 packed with a material 82, preferably a high molecular weight polyethylene glycol dispersed on a highly sorptive granular support material as previously described that selectively retards passage of aroma constituents. A predetermined volume of the aroma-bearing fraction collected from the stripping operation is vaporized and purged from the condenser 52 into column 80 through line 84 by means of an inert carrier gas such as nitrogen. Other inert gases such as argon, neon and helium or mixtures thereof may be used. The gas stream entering the packed column 80 therefore consists essentially of nitrogen, carbon dioxide and aroma constituents. The carrier gas is continually passed through the column 80. The elution effect that occurs in gas chromatography takes place and as a result, the aroma constituents are retained by the material 82 while the carbon dioxide is not and the resulting effluent initially leaving the column 80 through line 86 consists essentially of nitrogen and carbon dioxide which is directed into line 88 and vented to the atmosphere by opening valve 90 and closing valve 94. After a definite period of time which can be predetermined depending upon the volume of aroma-bearing fraction admitted into the column 80 and column geometry, the aroma constituents are then eluted from the material 82 by the nitrogen carrier gas. At this selected time, the effluent consisting essentially of aroma constituents and nitrogen is directed into line 92 by closing valve 90 and opening valve 94. The aroma constituents and nitrogen are then sent to compressor 65 and absorbed into the coffee oil as previously described or they can be separated from the nitrogen as by freeze-out with liquid nitrogen and stored in a suitable container for later incorporation into instant coffee.

The carbon dioxide can be detected in the effluent stream by means of a thermal conductivity detector 87 connected directly into line 86 downstream from the column 80. The detector used was a Gas Master instrument made by Gow Mac Instrument Company and consists of a portable battery operated thermal conductivity cell. The instrument detects the carbon dioxide in the effluent stream from column 80 by sending a negative response from the thermal conductivity cell since the thermal conductivity for carbon dioxide is less than nitrogen. The instrument response is such that the millivolt meter reading is 100 when pure nitrogen is passed through both sides of the detector. If carbon dioxide is present in one stream, the millivolt meter reading drops to a lower reading depending on the amount of carbon dioxide present. Therefore, the initial effluent from column 80 passed through the detector will cause the meter reading to drop from 100 to a low reading, remain low for a short period, and then return to 100 as the effluent becomes richer in nitrogen which is the time at which the aroma constituents are being eluted.

Table 1 presents data obtained by separating carbon dioxide from an aroma-bearing fraction collected from stripping 210 grams of moist ground roasted coffee for one hour at a temperature of 104° F., a pressure of 40 mm. and a nitrogen rate of 200 ml./minute. The Carbowax column was ½" in diameter with 10 inches of packing. Elution was conducted using a nitrogen purge of 200 ml./minute and a pressure of 10 p.s.i.g.

TABLE 1

| Time, mins. | 3.0 | 10.0 |
|---|---|---|
| Mg./gm.¹ coffee: | | |
| Isoprene | | 0.23 |
| Acetaldehyde | | 12.58 |
| Dimethyl sulfide | | 1.30 |
| Methyl formate | | 1.85 |
| Furan | | 1.04 |
| Propionaldehyde | | 2.10 |
| Isobutyraldehyde | | 6.40 |
| Acetone | | 25.07 |
| Methyl furan | | 3.20 |
| Butyraldehyde | | 0.25 |
| Methyl ethyl ketone | | 12.60 |
| Isovaleraldehyde | | 1.04 |
| Methyl alcohol | | 24.87 |
| Diacetyl | | 6.44 |
| Ethyl alcohol | | 3.76 |
| Acetyl propionyl | | 2.12 |
| Total (μ/gm.) | | 104.85 |
| Amount CO₂ (gms.) | 0.324 | 0.039 |
| Mol percent CO₂ | 16.5 | 1.99 |

¹ Micro-grams per gram coffee.

As seen from the data in Table 1, during the first three minutes, no aroma was eluted from the Carbowax column, whereas the carrier gas contained 16.5 mol percent carbon dioxide which had been eluted. The next 10 minutes shows a typical analysis of the aroma components eluted with only 2 mol percent carbon dioxide present in the gases.

The Carbowax column has the additional advantage of removing minute traces of water from the aroma gases as well as components such as hydrogen sulfide, acetone, and methanol.

The separation of carbon dioxide from the aroma-bearing fraction can be carried out by using two Carbowax packed columns operating in parallel. One column would be used for absorbing aroma products while the other column would be releasing aroma products for absorption into coffee oil.

It is to be understood that the stripping conditions can be varied. The temperature and pressure in the stripping column are interrelated and either may be varied when accompanied by an offsetting change in the other. For example, stripping can be carried out at a pressure range of about 20 to 60 mm. Hg absolute and the temperature may range from about 50° F. to 150° F. The preferred conditions are a pressure of 40 mm. Hg absolute and a temperature of 105° F. The nitrogen rate can vary from about 1 to 3 cubic feet per minute, the preferred rate being 2.1. The nitrogen rate is a function of two things, (1) optimum pressure drop across the bed and (2) efficiency of stripping. Stripping time can also be varied from 30 minutes to 2 hours, with optimum results being obtained in about 1 hour.

Stripping may be conducted without moistening the coffee bed, however, the aroma yield is much less than that obtained from wet stripping as shown in Table 2.

TABLE 2

Stripping 250 grams of coffee at 104° F. for 1 hour under 40 mm. pressure:

Yield—Micro-grams aroma per gram coffee:

| Wet | 144.21 |
|---|---|
| Dry | 40.48 |

As seen from the above data, the yield of aroma on a dry basis was 40.48 micro-grams per gram of coffee as compared to 144.21 micro-grams per gram of coffee when the coffee was moist at a water to coffee ratio of 1:1 on a weight basis.

The aroma constituents recovered from the stripping operation have been analyzed by gas chromatography and a typical analysis of an aroma fraction obtained by wet stripping 810 grams of coffee for one hour at a temperature of 104° F., a pressure of 40 mm. Hg and a nitrogen rate of 300 ml./minute is as follows:

| Isoprene | 0.44 |
|---|---|
| Acetaldehyde | 20.26 |
| Dimethyl sulfide | 3.63 |
| Methyl formate | 7.71 |
| Furan | 2.51 |
| Propionaldehyde | 3.94 |
| Isobutyraldehyde | 11.79 |
| Methyl ethyl ketone | 10.56 |
| Isovaleraldehyde | 1.56 |
| Methyl alcohol | 0.54 |
| Diacetyl | 1.91 |
| Ethyl alcohol | ---- |
| Acetyl propionyl | 1.89 |
| Acetone | 22.71 |
| Methyl furan | 5.20 |
| Butyraldehyde | 0.35 |
| Total (μ/gm.¹) | 95.00 |

¹ Micro-grams per gram coffee.

In the stripping operation, it is desirable to maintain a ratio of diacetyl to acetyl propionyl of at least 1:1 in the finished aroma product since it has been found to produce a more balanced aroma.

In accordance with the present invention, the coffee oil is dispersed in a water-soluble edible gum formed into discrete particles of a particle size in the same size range as the dry coffee powder, fortified with aroma by absorption and added to the dry coffee powder. The particles of coffee oil should be in the 500–800 micron size so as to be compatible with the size of spray dried instant coffee.

The capsules are formed from an emulsion of oil with a solution of an edible gum. The oil ordinarily is expressed coffee oil, as described above. However, other oils such as mineral oil may be used, with the obvious sacrifice of the aroma constituents present in the expressed coffee oil. The water-soluble edible gum may be, for example, gum arabic, polyvinyl alcohol, soluble starch, e.g. Starfilm 340, or the like. Ordinarily the solution will contain up to about 50% by weight gum and the emulsion preferably will contain about 25 to 75% by weight ratio oil, the balance being edible gum solution. The ratio of oil to gum will preferably be about 1:10 to 10:1.

The emulsion is spray dried by any conventional technique. Spray drying of food products is well known and need not be described here in detail. Reference may be made to the Encyclopedia of Chemical Technology, Second Edition, volume 7, pages 362 to 365, and the publications there cited. Typically, the drying gas temperature at the inlet will be 250 to 500° F. For example, an emulsion containing 20% coffee oil and 80% of a 20% solution of gum arabic was spray dried at 350° F. It was then exposed to coffee aroma in an evacuated chamber and allowed to stand for 8 hours.

In absorbing aroma into capsules of coffee oil, it is preferred to use the flash absorption process described hereinbefore. For example, the capsules are placed in a vessel and chilled, say, to −325° F., and the vessel is evacuated. The capsules then are warmed to room temperature and the vessel is filled with carbon dioxide-free aroma. After standing for several hours, unabsorbed aroma is removed. Typical residence time is 1–24 hours.

The amount of aroma absorbed by the coffee oil is in the range of about 0.1 to 0.5% by weight of the coffee oil. The amount of aromatized coffee oil added to the instant coffee is in the range of about 0.5 to 2% by weight of the instant coffee on a dry basis and is preferably 1%. The instant coffee containing the aromatized coffee oil is gas-packed under an inert atmosphere in a suitable container.

The process of the present invention assures against loss of coffee aroma during spray drying but rapid absorption of the aroma into the granules. Although the gum will not absorb aroma itself in spray drying the gum and oil, the oil readily absorbs it. The use of emulsion assures that the gum will not be a barrier to transfer of aroma to the oil in the dried granules.

Testing instant coffee containing the improved aroma obtained from the stripping operation indicated that it was uniformly preferred by a large number of people.

As many possible embodiments may be made of the invention without departing from the scope thereof, it is to be understood that all matter herein set forth or shown in the accompanying drawings is to be interpreted as illustrative and not in a limiting sense.

What is claimed is:

1. A process for producing aromatized granules which comprises emulsifying oil with water and a water-soluble edible gum, spray drying the resulting emulsion and exposing the resulting spray dried granules to coffee aroma vapor until there is absorbed by the oil an amount of aroma in the range of about 0.1 to 0.5% by weight of the oil.

2. A process as set forth in claim 1 in which the oil is coffee oil.

3. A process as set forth in claim 1 in which the gum is gum arabic.

References Cited

UNITED STATES PATENTS 1,922,416   8/1933   Block _____ 55—74

OTHER REFERENCES

Food Engineering, May 1959, pp. 92–93.

Coffee Processing Technology, vol. 2, pp. 51–52, Avi Publ. Co., Westport, Conn., 1963.

MAURICE W. GREENSTEIN, Primary Examiner

U.S. Cl. X.R.

99—140